Dec. 21, 1954  F. LEISTER  2,697,622
LOCKING MEANS

Filed Sept. 14, 1950  2 Sheets-Sheet 1

Inventor
FAYETTE LEISTER
Mitchell Bechert
Attorneys

Dec. 21, 1954  F. LEISTER  2,697,622
LOCKING MEANS
Filed Sept. 14, 1950  2 Sheets-Sheet 2
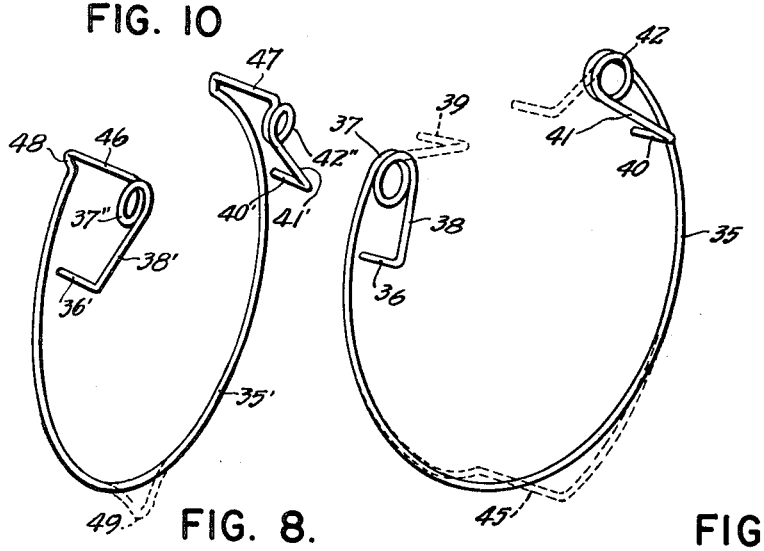
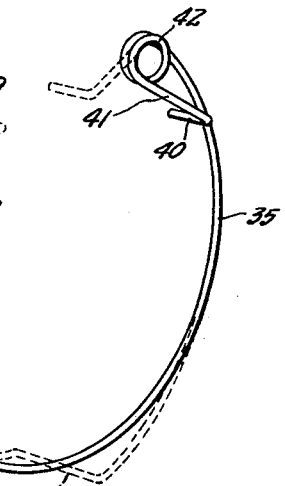
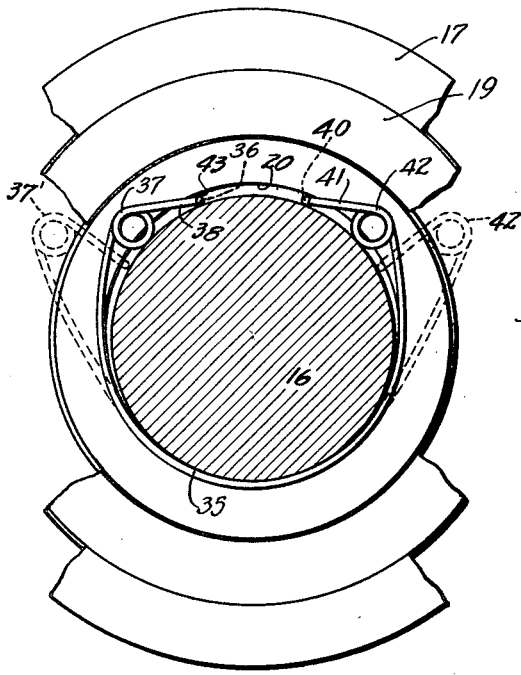
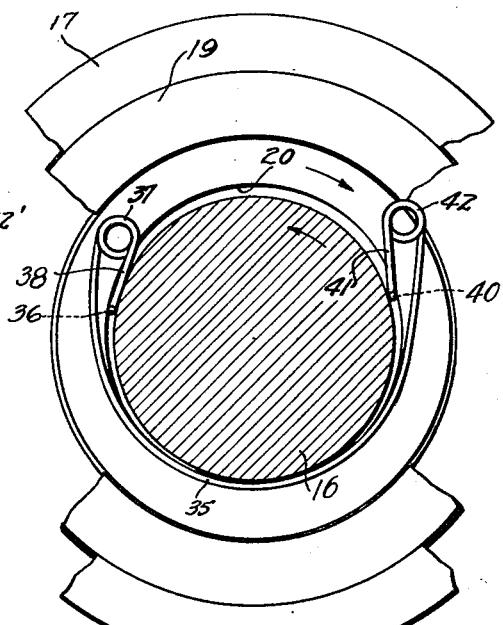
Inventor
FAYETTE LEISTER
By Mitchell Bechert
Attorneys > United States Patent Office 2,697,622
Patented Dec. 21, 1954

2,697,622

LOCKING MEANS

Fayette Leister, New Britain, Conn., assignor to The Fafnir Bearing Company, New Britain, Conn., a corporation of Connecticut Application September 14, 1950, Serial No. 184,730

5 Claims. (Cl. 287—52.09)

My invention relates to locking means for securing a bearing ring or the like to a shaft or other mounting means. The invention is in the nature of an improvement over the copending patent application of John A. Frederick, Serial No. 169,425, filed June 21, 1950, and over my pending application Serial No. 169,447, filed July 21, 1950.

It is an object of the invention to provide an improved device of the character indicated.

It is another object to provide a locking means of the character indicated which will involve substantially no additional axial length insofar as the accommodation of the inner bearing ring on the shaft is concerned.

It is also an object to provide an improved wire locking means of the character indicated.

It is a further object to provide an improved locking means which may be effective regardless of the direction of relative rotation of the bearing and of the shaft or other mounting means.

Also, it is an object to provide an improved locking means which may be self-retaining once installed and which may utilize standard inner-ring configurations.

It is a specific object to meet the above objects with a locking-ring construction which may be preassembled, and therefore shipped, with a standard bearing.

Other objects and various further features of novelty and invention will be pointed out or will occur to those skilled in the art from a reading of the following specification in conjunction with the accompanying drawings.

In the drawings, which show, for illustrative purposes only, preferred forms of the invention:

Fig. 7 is another perspective view, showing a further modified locking means of the invention;

Figs. 8 and 9 are fragmentary right-end views of a bearing on a shaft and showing successive stages of application of the locking means of Fig. 7 to such an assembly; and Fig. 10 is a perspective view of a slightly modified form of the locking means of Fig. 7.

Briefly stated, my invention contemplates an improved means for locking an inner bearing ring or the like to a shaft or other mounting means; the invention is particularly useful in the mounting of bearing rings having an eccentric locking counterbore at one end. The locking means in all forms to be described includes a generally longitudinally projecting rounded locking portion which is suitably supported by the shaft or by the inner bearing ring; but the means for support includes provision for the substantially free and unfettered rotation, even though only a partial rotation, of the locking portion about its own axis. In one of the general forms to be described, the locking portion is actually a pin or a roller having complete freedom to rotate about its own axis so that the locking function takes place in a manner analogous to conventional one-way engaging rolling clutches. In the other general form to be described, the locking portion is integrally formed with the supporting portion, but the arrangement is such that there is freedom for sufficient partial rotation of the locking portion to establish a roller-clutch action and thus to provide the desired lock. In certain forms, locks are provided at both ends of the same locking means so that the bearing ring may be locked to the shaft for either or both directions of relative rotation, without entailing loss of grip even when the direction of relative rotation is reversed.

Figure 1:
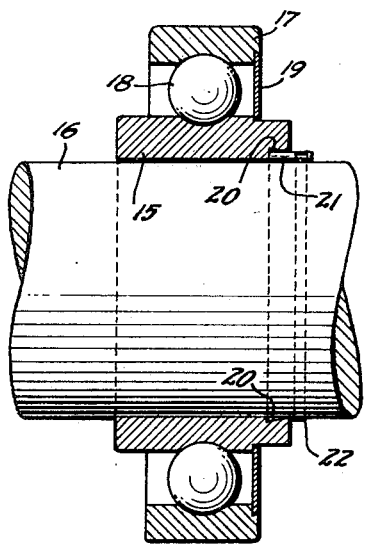
Fig. 1 is a longitudinal sectional view of a bearing secured to a shaft by means incorporating features of the invention.
Figure 2:
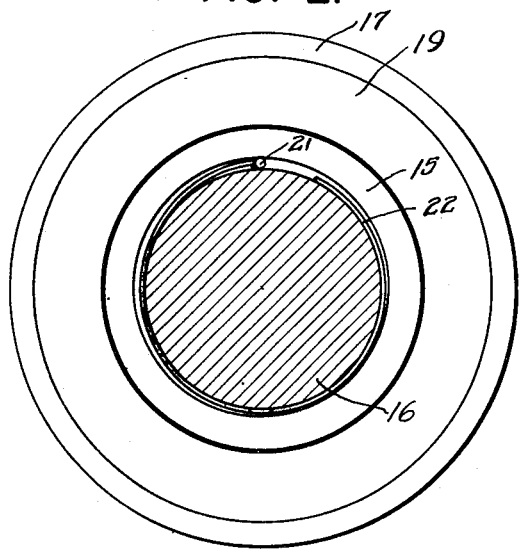
Fig. 2 is a right-end view of the assembly of Fig. 1.
Figure 3:
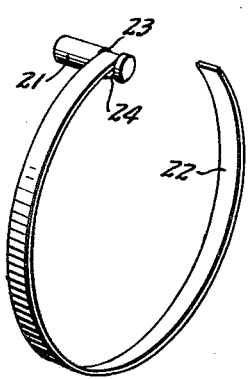
Fig. 3 is a perspective view of the locking means employed in the assembly of Fig. 1.

Referring to Figs. 1, 2, and 3 of the drawings, my invention is shown in application to an improved means for locking the inner bearing ring 15 of an antifriction bearing to a shaft 16. The bearing may include an outer ring 17 spaced from the inner ring 15 by a plurality of antifriction elements 18, and a shield 19 may be carried by the outer ring 17 at one end of the bearing. At one end of the inner bearing ring 15, the bore thereof may be provided with a counterbore 20 eccentric about the bearing axis, for locking purposes.

In accordance with the invention, I provide an improved means for establishing a lock or bind between the counterbore 20 and the shaft 16 upon a relative rotation of these elements. Such locking means may include a locking portion or element 21 extending generally longitudinally and of a thickness intermediate the maximum and minimum radial clearances characterizing the annular space between the counterbore 20 and the shaft 15. The locking portion 21 is preferably rounded or generally cylindrical and is supported with freedom to rotate so that, when the bearing ring 15 and the shaft 16 are relatively rotated, the locking portion or element 21 may partially rotate in a roller-clutch action. In the form shown in Figs. 1, 2, and 3, the locking portion or element 21 is a pin and the supporting means therefor is an open loop 22 of resilient material, which may be a ribbon of spring steel or the like. The pin 21 may be necked or circumferentially grooved, as at 23, near the outer end thereof, thus providing a means of connection to the loop 22. To fasten the loop 22 to the pin 21, one end need only be bent around and lightly crimped, as at 24, at the necked or grooved portion 23. It will be clear that if the loop 22 is of smaller diameter than the shaft when in an unstressed state, then the locking means will be self-retaining on the shaft, as shown clearly in Fig. 2.

Figure 4:
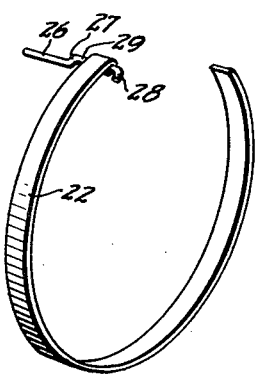
Fig. 4 is another perspective view showing alternative locking means for the assembly of Fig. 1.

In Fig. 4, I show a slightly modified arrangement which may be slightly less expensive to manufacture than the arrangement of Fig. 3. In Fig. 4, the locking portion or element is a suitably bent piece of wire with a first longitudinally projecting portion 26 to perform the locking function in the manner described for the lock of Fig. 3. Two radially offset portions 27—28 may be spaced by a longitudinal portion 29 in order to provide a means for locating the connection of the supporting loop 22 on the locking wire. As long as the radial offset 28 does not project radially inwardly beyond the rotational axis of the locking portion 28 by an amount exceeding the radius of the wire, it will be understood that there may be substantially complete freedom for the wire 26 to rotate in establishing the desired lock or bind. In practice, I find that only a relatively small amount of rotation need be involved in establishing the desired lock. Such rotation will of course depend upon the size of the wire, but for a suitably heavy wire substantially less than half a revolution of the wire will be involved.

Figure 5:
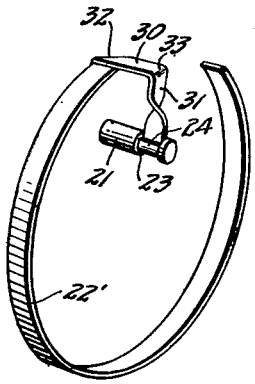
Fig. 5 is another perspective view illustrating a further modification of the Fig. 3 arrangement.

It is often desirable to ship bearings complete and preassembled with the necessary means for anchoring the bearing on a shaft, and in Fig. 5 I show an arrangement wherein locking means similar to that of Fig. 3 may be preassembled with a bearing. In Fig. 5, the locking portion or element 21 is again supported by an open resilient loop 22', but the loop 22' is connected to the groove 23 in pin 21 by means of adjacent longitudinal and radial offsets 30—31. These offsets may be formed integrally with the ribbon which constitutes the loop 22'. In the form shown, a 45° bend of the ribbon at 32 provides the longitudinal offset 30, and a right-angle bend at 33 joins the radial offset 31 to the longitudinal offset 30. A one-quarter twist in the radial offset 31 may properly orient the ribbon for a good support of the pin 21, as will be clear. It will be understood that a ribbon, such as the ribbon 22' with the longitudinal and radial offsets, may equally well accommodate a locking element such as that (26) shown in Fig. 4, and that in either case the main body or supporting portions of the loop may be adequately located on the inner bearing ring, as in a circumferential groove 34 in the outer surface thereof.

The remaining figures are concerned with arrangements in which the locking means and the supporting means therefor are formed integrally out of the same piece of material. In Figs. 7, 8, and 9 the locking device may be supported on the shaft, and in Fig. 10 the locking device may be supported on an inner bearing ring, such as the inner bearing ring 15' of Fig. 6.

The locking device of Figs. 7, 8, and 9 may comprise a suitably formed single piece of spring wire, and I have shown the device as including twin locks, one at each end of this single piece of wire. The wire may comprise a supporting or body portion 35 bent into a loop of diameter preferably slightly less than the shaft diameter, so that it may normally seek to hold itself upon the shaft. The body loop 35 may be sufficiently circumferentially extensive to span more than half the outer surface of the shaft so as to hold itself firmly in place. As in the case of the other described forms, the thickness or diameter of the wire is preferably intermediate the maximum and minimum radial clearances between the counterbore 20 and the shaft 16.

At one end of the wire, one locking means may comprise a longitudinally extending locking projection 36, and in accordance with the invention the connection between projection 36 and the body 35 is such that there may be partial rotation of the portion 36 about its own axis so as to permit establishment of the desired lock between the eccentric counterbore 20 and the shaft 16. In the form shown, the freedom for rotation is derived from a torsionally resilient suspension of the portion 36 from the body 35, as by provision of one or more turns 37 of the wire between the body 35 and the locking portion 36. For purposes which will later be clear, I also provide that the locking portion 36 shall have freedom for a certain amount of bodily displacement in the process of rotation about its own axis, and to this end an arm 38 may be integrally formed between the spring portion 37 and the locking portion 36.

The described construction is preferably so formed in an unstressed state that the arm 38 is bent back so as to place the locking projection 36 virtually alongside the body 35 near the spring 37, as shown by the solid outlines of Fig. 7. As indicated by the dotted outline 39 of Fig. 7, it is contemplated that the arm 38 shall be sufficiently free to be flexed through spring 37 into a stressed position substantially displaced from the unstressed position. Similar locking means 40, joined by an arm 41 to the other end of the body 35 by means of another torsional spring 42, may be provided; again, in an unstressed state, I prefer that the locking portion 40 be substantially alongside the body 35, as shown by solid outlines in Fig. 7.

In use, the locking means of Fig. 7 may be applied to a bearing on a shaft in the manner shown in solid outlines in Fig. 8. Such installation contemplates that the locking means 36—40 shall be stressed so as to spread the body 35 a maximum, thereby permitting insertion over the shaft and longitudinal insertion of the locking projections 36—40 into the counterbore at a location where such insertions may be made with some radial clearance, as at 43, for the case of the projection on arm 38. Once both locking projections 36—40 have been thus longitudinally inserted, the inherent resiliency of the locking means may cause the arms 38—41 to retract under the springs 37—42, and an initial light bind of the projections 36—40 between the counterbore and the shaft may arrest such retraction; at the time when this light bind is encountered the spring portions 37—42 may be radially outwardly extended, as shown in dotted outlines 37'—42' in Fig. 8. Upon a subsequent relative rotation of the inner bearing ring with respect to the shaft, as for example the relative rotation suggested by arrows in Fig. 9, one of the locking projections 36—40 may be forced to rotate, and for the relative direction shown the projection 36 will be driven in a clockwise direction (about its own axis). The required amount of such rotation will depend upon wire and bearing and shaft dimensions, but ordinarily about 90° of rotation will be sufficient to establish the desired bind; thus, for the proportions shown, when the lock is established, the left end of the locking means may be substantially completely retracted as shown in Fig. 9. Upon a reversal of relative rotation of the shaft and of the inner bearing ring, this bind may be relaxed slightly so as cause spring 37 to move slightly radially outwardly, while the locking projecting 40 on arm 41 is compelled to rotate counterclockwise (about its own axis) in establishing a bind for such reversed relative rotation. The ends 37—42 of the locking means may eventually appear as shown in Fig. 9, wherein the shaft 16 has been rotated counterclockwise relatively to the outer bearing ring and therefore to the inner bearing ring.

It is appreciated that shaft diameters and inner-bearing-ring counterbores may vary slightly, so that from the installation of one bearing to the next the annular clearance space between the counterbore and the shaft may vary slightly, thus slightly changing the spread between the locking projections 36—40 when in the locked position. Of course, it is desirable that these projections be permitted the partial rotation necessary to establish the lock, and, therefore, in certain cases it may be desirable slightly to shorten the circumferential span of the body 35. With the one-piece wire construction shown, it will be appreciated that such effective shortening may be easily accomplished merely by a local crimping or twisting of the body 35, as indicated by dotted outlines at 45 in Fig. 7. Crimping may be effected by means of pliers which have been given a partial twist, as will be clear.

Figure 6:
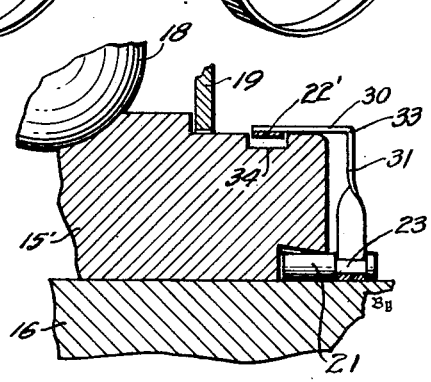
Fig. 6 is an enlarged fragmentary sectional view of a locking means according to Fig. 5, shown assembled with a bearing and a shaft.

In Fig. 10, I show a slight modification of the locking means in Fig. 7 in which provision is made for the body portion 35' to be carried on the inner bearing ring, as in the groove 34 (Fig. 6). In such case, the locking projections 36'—40' and arms 38'—41' must be longitudinally offset from the plane of the body 35'. It matters not whether the spring portions 37"—42" are in the plane of the arms 38'—41' or in the plane of the body 35', but I have shown the former arrangement, in which case longitudinal offsets 46—47 join the springs 37"—42" to the body 35'. If desired, the longitudinal offsets 46—47 may be joined to the body 35' by small radial offsets, as at 48, so that the body 35' may be recessed uniformly in the groove 34 for substantially its entire circumferential extent. It will be appreciated that the operation and function of the construction of Fig. 10 may be completely analogous to that described in Figs. 7, 8, and 9. However, if it is desired slightly to shorten the span of body 35', crimping is preferably made in the plane of body 35', as by means of a radially outward distention, such as that indicated by the dotted outline 49.

It will be appreciated that I have described novel and extremely simple locking means for anchoring an inner bearing ring to a shaft. The locking action may be positive and non-slipping, for the action is completely analogous to a roller-clutch action. Locking projections may be formed at both ends of the supporting means, so that two-way locking engagement may be effected. The locking means may be so formed as to oppose any play in a transfer of locks during a reversal of relative rotation of the parts.

While I have described my invention in detail for the preferred forms illustrated, it will be understood that modifications may be made within the scope of the invention as defined in the appended claims.

I claim:

1. In combination, a shaft, a bearing ring on said shaft, locking means for anchoring said bearing ring to said shaft, said bearing ring being formed with a bore for said shaft and with an eccentric locking counterbore at one end, said locking means comprising a rounded longitudinally projecting element of thickness intermediate the maximum and minimum radial clearances of the counterbore with respect to the shaft, said longitudinally projecting element being positioned in said counterbore and means for supporting said element for at least partial rotation about its longitudinal axis, said locking means being integrally formed from a single piece of wire with a supporting portion circumferentially enveloping said shaft, one of the ends of said piece of wire being formed with a torsionally resilient spring portion resilient generally about a longitudinal axis, said longitudinally projecting element being joined to said supporting portion at the resiliently supported end of said spring portion.

2. In combination, a shaft, a bearing ring on said shaft, locking means for anchoring said bearing ring or the like to a shaft, said bearing ring being formed with a bore for said shaft and with an eccentric locking counterbore at one end, said locking means comprising a rounded longitudinally projecting element of thickness intermediate the maximum and minimum radial clearances of the counterbore with respect to the shaft, said longitudinally projecting element being positioned in said counterbore and means for supporting said element for at least partial rotation about its longitudinal axis, said locking means being integrally formed from a single piece of wire with a supporting portion engaging and supported on said shaft, one of the ends of said piece of wire being formed with a torsionally resilient spring portion resilient generally about a longitudinal axis, said longitudinally projecting element being joined to said supporting portion at the resiliently supported end of said spring portion.

3. The combination according to claim 2, in which resiliently supported longitudinally projecting locking portions are formed at both ends of said piece of wire, whereby a lock may be established between the counterbore and said shaft for both directions of relative rotation of the inner bearing ring with respect to the shaft, and whereby both locking portions may partially rotate in establishing locks for both said directions of relative rotation.

4. The combination according to claim 2, in which said longitudinally extending locking portion is at the end of an arm connecting the same to said spring portion, whereby said locking portion may be displaced substantially about the resilient axis of said spring portion while at the same time partially rotating about its own axis.

5. The combination according to claim 2, in which said spring portion is longitudinally offset from said supporting portion, whereby said supporting portion may be carried by the inner bearing ring.

References Cited in the file of this patent

UNITED STATES PATENTS

| Number | Name | Date |
|--------|------|------|
| 576,665 | Farrar | Feb. 9, 1897 |
| 1,016,620 | Gapp | Feb. 6, 1912 |
| 1,118,934 | Humphrey | Dec. 1, 1914 |
| 1,220,185 | Cathcart | Mar. 27, 1917 |
| 1,788,891 | Runge | Jan. 13, 1931 |
| 1,909,230 | Smith | May 16, 1933 |
| 2,122,925 | Bins | July 5, 1938 |